United States Patent [19]

Matsuda

[11] 4,214,644
[45] Jul. 29, 1980

[54] MOTORIZED TWO-WHEEL VEHICLE HAVING A V-TYPE ENGINE WITH ANGULARLY OFFSET CYLINDER HEADS

[75] Inventor: Minoru Matsuda, Chofu, Japan

[73] Assignee: Honda Giken Kogyo Kabushiki Kaisha, Tokyo, Japan

[21] Appl. No.: 952,133

[22] Filed: Oct. 17, 1978

[30] Foreign Application Priority Data

Oct. 22, 1977 [JP] Japan ............... 52-141388[U]

[51] Int. Cl.² .................. B62K 11/04; F02B 75/24
[52] U.S. Cl. ........................... 180/226; 123/55 R
[58] Field of Search ............ 180/33 A, 33 R, 226, 180/219; 123/52 MV, 55 R, 55 VF

[56] References Cited

U.S. PATENT DOCUMENTS

| | | | |
|---|---|---|---|
| 2,316,477 | 4/1943 | Weaver | 180/33 R |
| 3,757,882 | 9/1973 | Honda | 180/33 R |
| 3,937,484 | 2/1976 | Morioka et al. | 180/33 R |

FOREIGN PATENT DOCUMENTS 378063  1/1940  Italy ........................ 123/55 R

*Primary Examiner*—John J. Love
*Assistant Examiner*—Donn McGiehan
*Attorney, Agent, or Firm*—Haseltine, Lake & Waters

[57] ABSTRACT

A motorized two-wheeled vehicle comprising a frame having front and rear wheels and a vertical V-type engine mounted on the frame in a central region between the wheels. The engine comprises at least one pair of left and right cylinders arranged in the form of V and a pair of left and right carburetors are mounted rearwardly of the cylinders and are connected to the respective cylinders by intake pipes. A cylinder head of each cylinder is secured to a cylinder block such that the head is angulated to assume an angular position in which the axis of the cross-flow pattern is inclined inwardly and towards the rear with respect to the longitudinal axis of the engine to form an angle therewith.

3 Claims, 4 Drawing Figures

MOTORIZED TWO-WHEEL VEHICLE HAVING A V-TYPE ENGINE WITH ANGULARLY OFFSET CYLINDER HEADS

FIELD OF THE INVENTION

This invention relates to a motorized two-wheeled vehicle, such as a motorcycle or the like.

PRIOR ART

In this type of two-wheeled vehicle, there is known an arrangement comprising a frame having front and rear wheels, a vertical V-type engine mounted in a central region of the frame, the engine comprising at least a pair of left and right cylinders arranged in the form of a V, and a pair of left and right carburetors mounted behind the engine and connected to respective cylinders. In this case, it is desirable for the two carburetors to be close together and parallel to one another for synchronizing adjustment and other purpose and for the carburetors to be connected to the respective cylinders through the shortest possible and straight intake pipes.

SUMMARY OF THE INVENTION

An object of the invention is to provide a two-wheeled vehicle which satisfies the above requirements.

In accordance with the object of the invention there is provided a motorized two-wheel vehicle comprising a frame, front and rear wheels mounted on said frame, a V-type engine mounted on the frame in a central portion thereof, said engine having a longitudinal axis and including at least one pair of left and right cylinders, and carburetors connected to respective cylinders and mounted rearwardly of the engine on the frame, each cylinder including a cylinder block and a cylinder head, said cylinder head having an axis for a cross-flow pattern and means mounting said cylinder head on said block in an angularly offset position such that the axis of the cross-flow pattern of the cylinder head is inclined inwardly towards the rear relative to the longitudinal axis of the engine to form an angle therewith.

In a particular embodiment of the invention the angle between the axis of the cylinder head and the axis of the engine is about 20°.

In further accordance with the invention, the connecting pipes joining the carburetors with respective cylinder heads are each substantially rectilinear.

DETAILED DESCRIPTION

Figure 1:
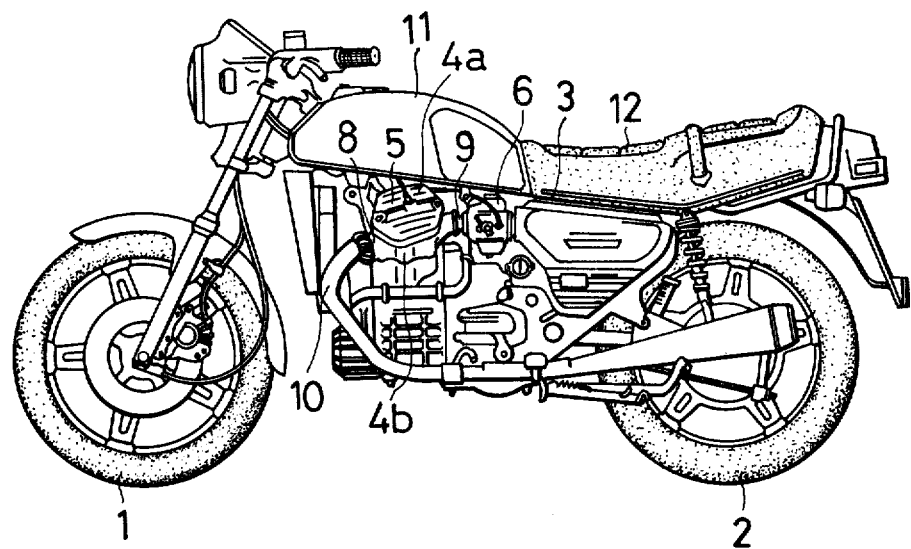
FIG. 1 is a side view of one embodiment of a two-wheeled vehicle according to this invention.

The drawing shows a two-wheeled vehicle having a frame 3 with a front wheel 1, a rear wheel 2 and a vertical V-type engine 5 mounted on the frame in a central region between the wheels. The engine comprises at least one pair of left and right cylinders 4 arranged in the form of a V and a pair of left and right carburetors 6 are mounted behind the cylinders 4 and are connected to the respective cylinders 4 by pipes 9.

Each cylinder 4 has a cylinder head 4a secured to a cylinder block 4b in such a manner that the cylinder head 4a is angulated with respect to the cylinder block to assume an angular position in which the axis X—X of the cross-flow pattern is inclined inwardly towards the rear with respect to a longitudinal axis A—A of the engine. More specifically, in the conventional arrangement, the cylinder heads are mounted on the cylinder blocks to lie in planes whose intersection with horizontal planes forms lines extending parallel to a vertical plane passing through the longitudinal axis Y—Y of the engine, whereas in the arrangement according to the invention, the cylinder heads lie in planes whose intersection with horizontal planes form lines parallel to axis X—X which are inclined inwardly and towards the rear with respect to axis Y—Y.

Figure 3:
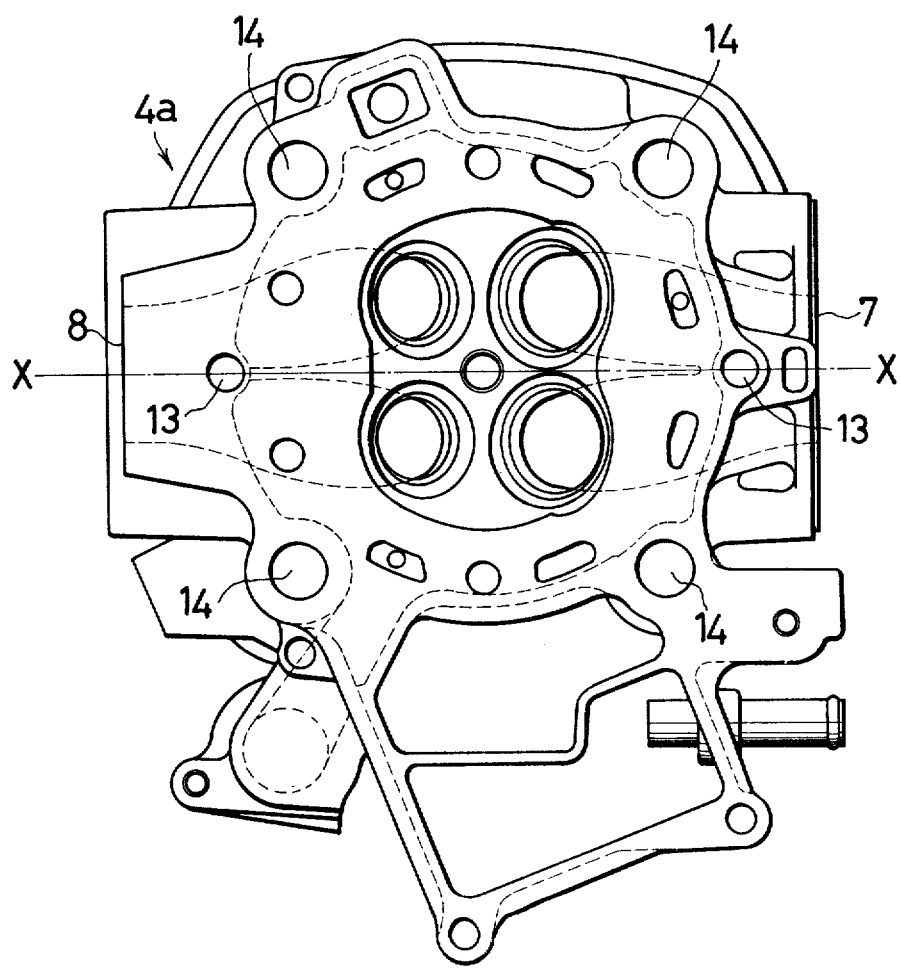
FIG. 3 is a top plan view of a cylinder head portion thereof.
Figure 2:
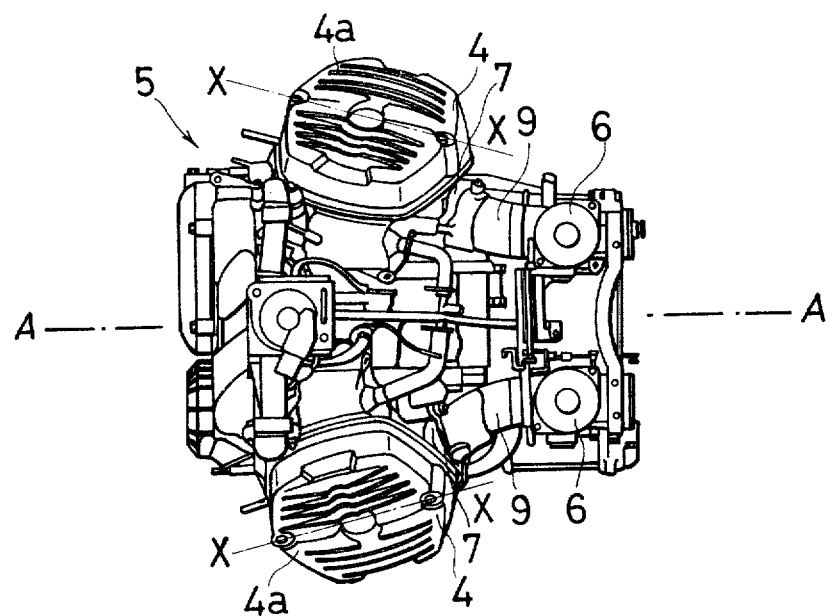
FIG. 2 is a top plan view of a major portion thereof.

As best seen in FIG. 3 each cylinder head 4a is provided along the axis X—X of the cross-flow pattern with a rear intake port 7 and with a front exhaust port 8, each cylinder 4 being connected with each carburetor 6 through a respective intake pipe 9 extending rearwards from the intake port 7. Each cylinder 4 is provided with a respective exhaust pipe 10 extending forwards from the exhaust port 8. The left and right carburetors 6 are disposed so as to be close to one another and parallel to one another for facilitating synchronizing adjustment and other purposes. Numeral 11 denotes a fuel tank mounted above cylinders 4, and numeral 12 denotes a driver's seat rearward of the fuel tank.

As best seen in FIG. 3, each cylinder head 4a is provided along axis X—X, with a pair of rear and front pin openings 13 so that the openings may be positioned in relation to the lower cylinder block 4b by positioning pins engaged in the openings 13.

Figure 4:
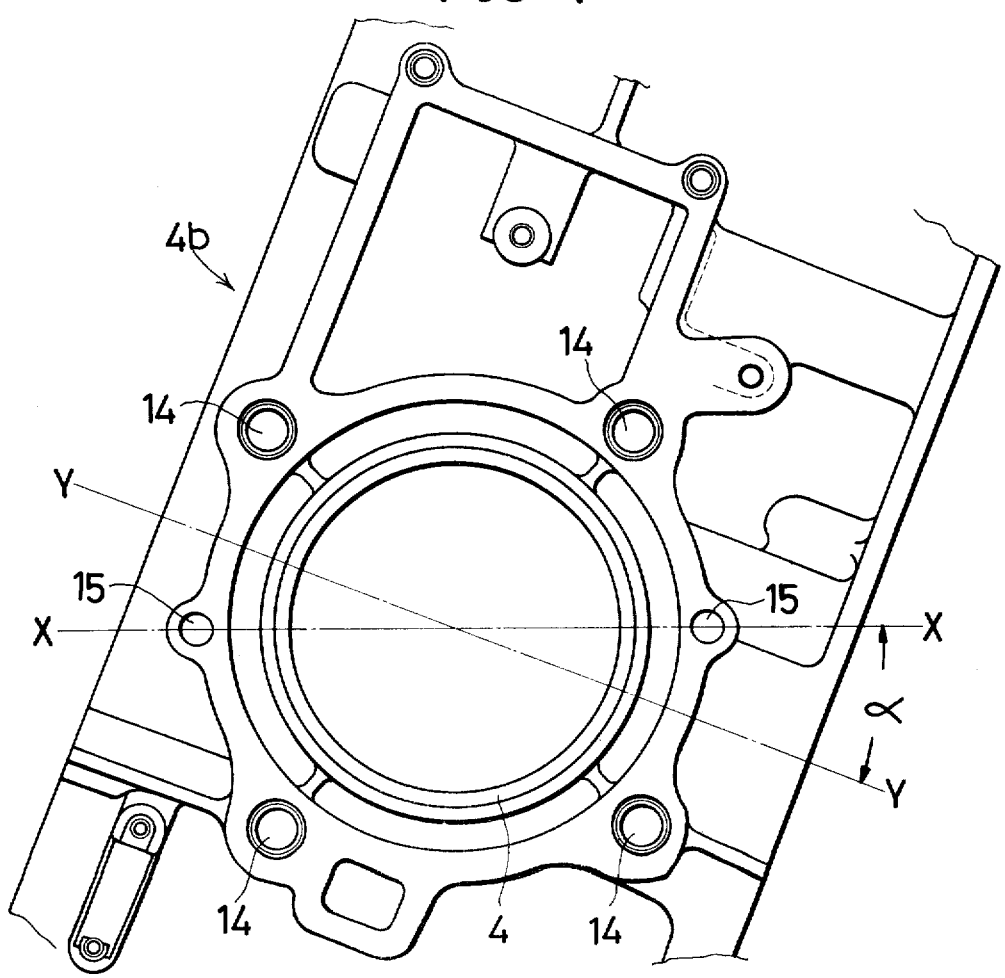
FIG. 4 is a top plan view of a cylinder block thereof.

As best seen in FIG. 4, pin openings 15 on the block 4b are located on the axis X—X angularly offset from a longitudinal axis Y—Y of the block 4b (extending parallel to axis A—A) so that when the head 4a is applied onto the block 4b and the pin openings are aligned it is given the aforesaid angulated position. The angle of offset α between axes X—X and Y—Y is about 20 degrees. The left and right cylinder blocks 4b are integrally formed. Each cylinder head 4a and the cylinder block 4b have four respective bolt openings 14, and these are connected together by engaging respective bolts in the openings 14.

Thus, according to this invention, in an arrangement of the type in which frame 3 supports in its middle portion V-type engine 5 comprising at least a pair of left and right cylinders 4 arranged in the form of a V, the upper cylinder head 4a of the cylinder 4 on each side is fixed to the lower cylinder block 4b such that the head 4a is angularly offset to assume an angular position in which its axis X—X of the cross-flow pattern is inclined inwardly towards the rear so that the intake ports 7 of the respective heads 4a are offset inwards towards the longitudinal plane of symmetry through the axis A—A. Consequently, the respective intake pipes 9 connecting the cylinders 4 with the respective carburetors 6 at the rear of the cylinders are made as short and as straight as possible. Thereby, respective intake operations are made smooth, which is effective for improving engine output, while additionally the engine 5 becomes comparatively small in width at its upper portion so that interference with the driver's knees can be prevented.

What is claimed is:

1. A motorized two-wheel vehicle comprising a frame, front and rear wheels mounted on said frame, a V-type engine mounted on the frame in a central portion thereof, said engine having a longitudinal axis and including at least one pair of left and right cylinders, and carburetors connected to respective cylinders and mounted rearwardly of the engine on the frame, each cylinder including a cylinder block and a cylinder head, said cylinder head having a cross-flow pattern with an axis, means mounting said cylinder head on said block in an angularly offset position such that the axis of the cross-flow pattern of the cylinder head extends inwardly towards the rear relative to the longitudinal axis of the engine and forms an angle therewith, and connecting pipes joining the carburetors with respective cylinder heads, each connecting pipe being substantially rectilinear.

2. A motorized two-wheel vehicle comprising a frame, front and rear wheels mounted on said frame, a V-type engine mounted on the frame in a central portion thereof, said engine having a longitudinal axis and including at least one pair of left and right cylinders, and carburetors connected to respective cylinders and mounted rearwardly of the engine on the frame, each cylinder including a cylinder block and a cylinder head, said cylinder head having a cross-flow pattern with an axis, means mounting said cylinder head on said block in an angularly offset position such that the axis of the cross-flow pattern of the cylinder head extends inwardly towards the rear relative to the longitudinal axis of the engine and forms an angle therewith, and positioning means on each cylinder head and its respective block for establishing the angularly offset position of the cylinder head on the block.

3. A vehicle as claimed in claim 1 or 2 wherein the angle between the axis of the cross-flow pattern of the cylinder head and the axis of the engine is substantially 20°.

* * * * *